United States Patent
Page et al.

(10) Patent No.: US 9,477,573 B2
(45) Date of Patent: Oct. 25, 2016

(54) METHOD OF MONITORING THE PERFORMANCE OF A SOFTWARE APPLICATION

(75) Inventors: David John Page, Bath (GB); Rupert Lawrence Grantham Ogilvie, Letchworth (GB); Jonathan Michael Pitts, London (GB)

(73) Assignee: ACTUAL EXPERIENCE PLC, Somerset (GB)

( * ) Notice: Subject to any disclaimer, the term of this patent is extended or adjusted under 35 U.S.C. 154(b) by 385 days.

(21) Appl. No.: 13/386,551

(22) PCT Filed: Jul. 21, 2010

(86) PCT No.: PCT/EP2010/060575
§ 371 (c)(1),
(2), (4) Date: Mar. 14, 2012

(87) PCT Pub. No.: WO2011/009892
PCT Pub. Date: Jan. 27, 2011

(65) Prior Publication Data
US 2012/0166636 A1    Jun. 28, 2012

(30) Foreign Application Priority Data
Jul. 24, 2009 (GB) .................................. 0912931.3

(51) Int. Cl.
G06F 15/173 (2006.01)
G06F 11/34 (2006.01)
H04L 12/26 (2006.01)

(52) U.S. Cl.
CPC ....... *G06F 11/3409* (2013.01); *G06F 11/3457* (2013.01); *H04L 43/08* (2013.01); *G06F 2201/865* (2013.01)

(58) Field of Classification Search
USPC ........................................................ 709/224
See application file for complete search history.

(56) References Cited

U.S. PATENT DOCUMENTS

7,171,337 B2 * 1/2007 Yuan ..................... G06F 11/079
340/500
7,197,428 B1 3/2007 Saghier et al.
(Continued)

*Primary Examiner* — Alicia Baturay
(74) *Attorney, Agent, or Firm* — Maschoff Brennan (57) ABSTRACT

A method of monitoring the level of performance of a software application running on a network-attached computing device, comprises monitoring information exchange at least one station on the network; measuring at least two performance indicator metrics, such as delay, jitter, loss, response time, throughput, goodput, and object size; and deriving an indicator parameter from a non-linear combination of the indicator metrics. A transformation may be applied to each indicator metric to obtaining a corresponding derived value, and the derived values then additively combined, to obtain the said indicator parameter. The transformation has a first region in which the derived value depends relatively weakly on the corresponding metric, and a second region, in which the derived value depends relatively strongly on the corresponding metric. A score value may be entered by a user, indicative of the user's perception of the performance of the software application, and compared with the derived indicator parameter. The calculation used to derive the indicator parameter may be varied, in dependence on the user-entered score. Diagnostic traces may be triggered in dependence on the derived indicator parameter. Values of the indicator parameter and associated trace data may be collected in a database and collated to diagnose and/or predict problems in the said computer system.

15 Claims, 4 Drawing Sheets

(56) References Cited

U.S. PATENT DOCUMENTS

| | | | | |
|---|---|---|---|---|
| 7,284,153 B2 * | 10/2007 | Okbay | ................ | G06F 11/364 714/30 |
| 7,337,092 B2 * | 2/2008 | Yuan | ................ | G06F 11/079 340/3.1 |
| 7,369,967 B1 * | 5/2008 | Washburn | ................ | G06F 11/3419 702/182 |
| 7,412,503 B2 * | 8/2008 | Chess et al. | ................ | 709/223 |
| 7,480,912 B2 * | 1/2009 | Arnold | ................ | G06F 9/5016 711/111 |
| 7,788,362 B2 * | 8/2010 | Chess | ................ | H04L 41/0893 709/223 |
| 8,321,548 B2 * | 11/2012 | Glendinning | ................ | H04L 41/0843 370/254 |
| 8,332,811 B2 * | 12/2012 | Festa | ................ | G06F 8/34 709/217 |
| 8,359,581 B2 * | 1/2013 | Ortiz | ................ | G06F 11/3664 714/25 |
| 8,751,284 B2 * | 6/2014 | Goja | ................ | G06Q 10/0633 705/7.26 |
| 2003/0172145 A1 * | 9/2003 | Nguyen | ................ | 709/223 |
| 2003/0187617 A1 | 10/2003 | Murphy et al. | | |
| 2005/0149809 A1 * | 7/2005 | Draeger | ................ | G06F 11/3495 714/746 |
| 2008/0244526 A1 | 10/2008 | Chang et al. | | |
| 2009/0125496 A1 * | 5/2009 | Wexler | ................ | G06F 17/30483 |

* cited by examiner

METHOD OF MONITORING THE PERFORMANCE OF A SOFTWARE APPLICATION

The present invention relates to the monitoring of computer software applications, and in particular, to the measurement, management and optimisation of the perception of the performance of networked software applications.

Businesses are increasingly reliant on software applications in order to compete and meet economic objectives. Business processes can be categorised into those involving the direct involvement of human beings, for example web, voice and video applications, and processes, not involving humans, such as machine-only factory environments.

Business reliance on software applications means that the impact of application under-performance can be significant, in particular when users are aware of that under-performance and become frustrated or annoyed with the application as it hinders their ability to complete tasks efficiently. This can have serious negative economic consequences, reducing business process efficiency and staff morale within a business as well as reducing customer loyalty and brand value for those outside the business. Businesses, therefore, must try to ensure that individual applications perform consistently and at a level that meets the needs of the internal or external business process it supports, i.e. ensuring that users do not become frustrated with applications that they use.

However, this is not straightforward because application performance, as experienced by users or machines, relies on an underlying IT infrastructure that is increasingly complex. For instance, it is not unusual for IT infrastructure to involve multiple technologies such as fixed and mobile radio networks, local area networks (LANs), public and private wide area networks (WANs) (internet and intranet), data centres, servers, caches, virtual machines, proprietary and open communication protocols. Often technologies are supplied as services to businesses by multiple third parties such as Service Providers (SPs), which can increase the administrative complexity of IT infrastructure. Each technology will often require the deployment of tens, hundreds or thousands of individual systems. In operation, the behaviour of each system and technology is not only different, but dynamic, dependent on the load on that system at any instant in time. Ultimately, application experience, as perceived by users, is the result of many interacting individual system behaviours. To make matters more complex, different applications are affected in different ways, and hence are perceived differently, by the combined behaviour of IT infrastructure systems.

The implementation of application performance management (APM) on behalf of a business therefore requires the skills of experts as well as advanced APM tools. There are a range of APM tools and techniques currently available. Some APM tools focus on the performance management of a sub-set of IT infrastructure technologies. Whilst this is useful for the management of these technologies at a system level, a disadvantage of these tools is that they often fail to manage all the technologies that support an application and therefore cannot manage application performance as perceived by the user. Some APM tools therefore focus on the overall, end-to-end, performance of an application. These tools can be either active or passive in their method.

Active tools are able to simulate user application experience, for example by executing scripts that mimic how users use an application. Typically, scripts are executed on workstations attached to the IT infrastructure of a business. Measurements are made during simulations that provide data to APM experts that will help them understand the performance of the application. For example, the response-time of an application may be measured.

Passive tools, by contrast, use hardware and software instrumentation to measure the actual use of applications by users. Instrumentation points can be placed in various locations in the IT infrastructure, for instance, within data centres or other major business locations. Measurements are made of actual user traffic and data is provided to APM experts that helps them to understand the performance of the application. Once again, measurements will typically describe the response-time of an application.

An advantage of response-time measurement is that response-time is a straightforward concept for engineers to understand. However, a significant disadvantage of response-time measurement is that it is not a reliable indicator of performance as perceived by users, and fails to indicate whether a user is frustrated or otherwise by an application. This difference in perception arises from the fact that individual users use the same application in different ways or have different performance expectations of the same application. Hence users will have a unique individual perception of performance. Similarly, because users use different applications to achieve different tasks, a user may not be frustrated by a slow response-time from one application but may be frustrated by a similarly slow response from another, particularly if the tasks vary in urgency or importance.

A further disadvantage of simple response-time measurement is that it provides no explanation of what IT infrastructure behaviour or combination of system behaviours caused deterioration in performance, or of what behaviour or combination of behaviours will cause deterioration in performance in the future. This makes it very difficult for APM experts to diagnose and fix IT infrastructure behaviour that is having a negative economic impact, i.e. because of frustrated users.

A further disadvantage of response-time measurement is it does not indicate the instant when IT infrastructure behaviour or combination of system behaviours caused deterioration in performance as perceived by users.

A further disadvantage of passive APM tools is that they require a detailed understanding of the protocols and encodings used by individual applications. This can often mean that passive APM tools do not support all applications or application types because of finite APM vendor resources.

Active APM tools must generally learn scripts or have scripts created manually before they begin operation. This can often mean that active APM tools do not support all applications or application types because of finite IT expert resources.

A further disadvantage of many passive APM tools is that they require the installation and support of physical measurement instrumentation devices. These are often expensive to purchase, install and operate, which limits how widely they can be deployed. Passive APM tools may also store personal user data, which can often create additional security or privacy issues, which results in greater administrative costs for a business.

According to the invention, there is provided a method of monitoring the level of performance of a software application running on a computing device attached to a computer network and communicating with one or more network-attached devices, which method comprises:
monitoring information exchange, for example, information packets, at least one station on the network;

measuring at least two performance indicator metrics associated with the information exchange; and
deriving an indicator parameter, from a non-linear combination of the said indicator metrics.

In a further aspect of the invention, there is provided a method of diagnosing and/or predicting problems in a computer system including a computer network, comprising collecting in a database an indicator parameter derived in accordance with a monitoring method as previously described, from each of a plurality of computing devices connected to a computer network, and collating data from the said collected parameters in order to diagnose and/or predict problems in the said computer system.

Such a system may include means for triggering a diagnostic trace into the network, for stimulating a response from the network or the computing infrastructure, in dependence upon the value of the said indicator parameter, and the step of collecting in a database may include the step of collecting data resulting from said diagnostic traces triggered in dependence of the value of the said indicator parameter.

The preferred metrics are one or more of delay, jitter, loss, response time, throughput, goodput, and object size.

The term software application as used herein also includes peer-to-peer and machine-to-machine applications communicating between network-attached devices.

The invention is based on the realisation that a user's perception of the performance of a network application is not related in a linear manner to performance indicator metrics that can be easily measured. Instead it reflects a complex dependence on those metrics, which is non-linear in its form, and which generally displays at least a first region, in which the user perception is relatively unaffected by changes in the metric, and a second region, in which user perception is relatively strongly affected by changes in the metric. Accordingly, in a preferred embodiment of this invention, a non-linear transformation is applied to each said indicator metric, in order to obtaining a corresponding derived value, and at least two of the derived values are then additively combined, to obtain the said indicator parameter. The non-linear transformations are such as to generate a first region within which the corresponding derived value depends relatively weakly on the corresponding metric, and a second region, within which the corresponding derived value depends relatively strongly on the corresponding metric. The transformation may be carried out in various way, for example by means of a piece-wise mathematical function, having linear, or non-linear component pieces, or by a multivariate rational function, which may approximate the values of a corresponding piece-wise mathematical function. Alternatively, a simple two-dimensional lookup table may be utilised.

The general principle for each non-linear derived value is that there is a range of values of the metric for which it has only marginal impact on the non-linear derived value (and hence, on the user's perception), and another range of values for which the user-perceived quality degrades noticeably as the metric changes. There may also be another range of values for which the degradation in perceptual quality is already noticeable and continues to degrade, but not at such a severe gradient. There may also be parts of the said ranges in which the corresponding derived value runs counter to the weak or strong dependence on the corresponding metric over a subset of the range of metric values. This can occur if the said software application adapts its operation in response to detected impairments, e.g. enabling a forward error correction mechanism to protect against information loss if said loss exceeds a threshold. Such adaptation can provide improvement in user perception, but only over a limited range of metric values, outside of which the weak or strong dependence of the derived value on the corresponding metric prevails.

The indicator parameter (or calculated user perception score) is indicative of user perception of the performance of the said software application, and provides a significantly more reliable indicator of user experience than measurement of a single metric. Existing methods typically measure only a single parameter (usually response time, or throughput) and the significance of measurements made for this single metric (in terms of user perception) is typically not quantified. The user perception score is a proxy for a group of users voting on their perception of the performance of the said software application. In its generic form, the proxy is for a non-specific group of voters. For machine-to-machine applications, the score represents the perception of a proxy user sitting on the device.

The non-linear derived values, which form the additive components of the indicator may have a distinct perceptual meaning, e.g. relating to the interactivity of the said software application, and may correspond to a distinct component of communication that is part of the said software application, e.g. static and dynamic web content being delivered from separate network caches or web servers.

The calculated indicator parameter may be visualized graphically, either in qualitative or quantitative forms. Typically the graphical indicator is simplified to display, or to summarize, at multiple levels of user perception (e.g. "bad", "poor", "fair", "good", and "excellent"). The process used to calculate the user perception score can have its parameter values adjusted in order to change the specificity of the score as a proxy for a group of voters. The specificity can range from a generic, non-specific parameterisation, through group-specific, to user-specific, depending on who is adjusting the parameters, and how. For example, the workstation can receive feedback from the user to indicate whether the user's personal experience corresponds with the displayed graphical indicator, and the computations which are used to calculate the indicator components and the overall indicator parameter (called the user perception configuration), are automatically changed, in response to the said user input. Alternatively, the corporate IT team in an organisation can take responsibility for adjusting the user perception configuration to tune it to the needs of particular groups of users and their perception requirements for specific software applications. For machine-to-machine applications the parameterisation is adjusted to represent the impact on the machine's processes that require communication with other machines.

The indicator parameter may be used to trigger (whether directly, or probabilistically) diagnostic traces into the network and computing infrastructures. This enables the behaviour of these infrastructures to be checked at the moment that the user perception is degrading (or in proportion to the probability that the user perception is degrading). Existing methods typically have a significant time lag between the user perception degradation being reported, and diagnostic investigations being undertaken. Also, single metric measurements cannot be used as reliable triggers for diagnostic traces because the significance of the measurements is not quantified in terms of user perception.

Accordingly, in a preferred aspect of the invention, the method includes the step of triggering a diagnostic trace into the network, for stimulating a response from the network or the computing infrastructure, in dependence upon the value of the said indicator parameter.

In one embodiment, monitoring of information exchange may be carried out on the said computing device. Alternatively (or additionally) the said monitoring of information exchange may be carried out on a network-attached device other than the said computing device.

Information exchange associated with several software applications can be monitored on the device and separate graphical displays provided for and separate diagnostic traces triggered for each application (for instance, each web-site).

Information monitoring can be passive (e.g., by measuring round-trip time of application-generated packets) or active (e.g., by firing custom requests into the network and computing infrastructure, to test the response to specific stimuli).

Data on the user perception experience of many users on the network can be collected in a database, collated over time and space (e.g. location), and used to summarize, diagnose and predict perception problems caused by the network and computing infrastructure.

Data resulting from user feedback can be collected in a database and collated to provide computation configurations of the user perception score tuned for different application types and categories of user, ranging from the generic to the specific.

A number of preferred embodiments of the invention will now be described in detail, in conjunction with the accompanying drawing, in which.

Figure 1:
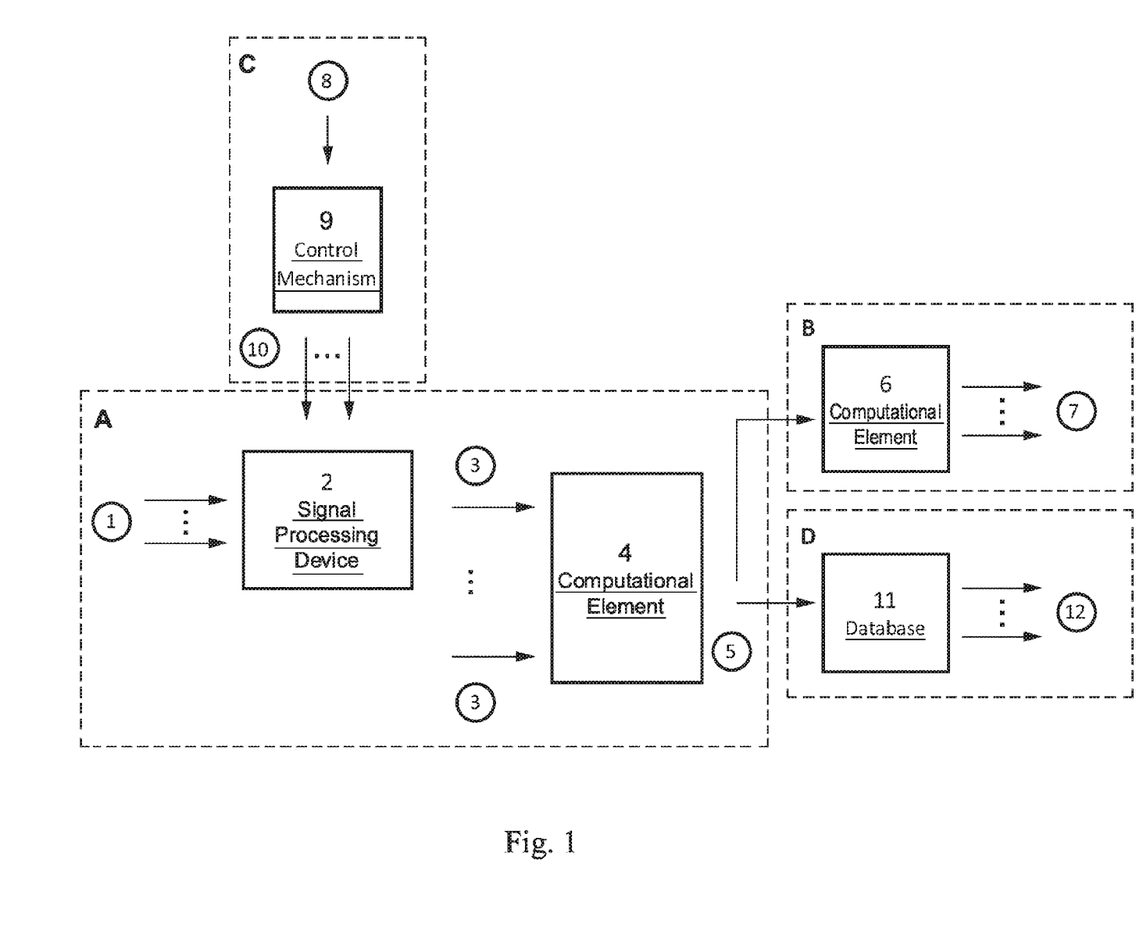
FIG. 1 is a schematic diagram of the method of operation in accordance with the invention.

FIG. 1 illustrates schematically a preferred method in accordance with the invention, in which the first step is the collection of two or more indicator metrics (1). The collected indicator metrics are then combined mathematically in a signal processing device 2, in a non-linear fashion, which will be described in more detail hereinafter, to produce a corresponding derived value or "indicator component" (3). A number of such derived values (3) are then additively combined in a further computational element (4), to produce an indicator parameter (5) indication of a calculated user perception score. The indicator parameters (5) may be processed by a computational element 6, and displayed graphically on display elements 7.

Feedback (8) may be provided from the user, or from a corporate IT team, and used to transform the calculation of the indicator parameter via control mechanism (9), with input parameters (10). Data may be collected in a database collation (11), and processed to produce an output (12) which summarizes, diagnoses and predicts perception problems caused by network and computing infrastructure.

Figure 3:
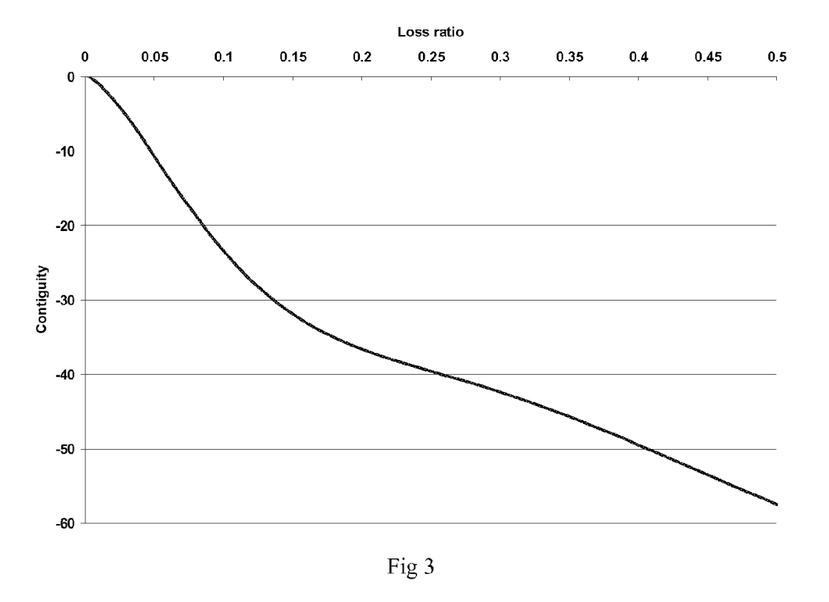
Figure 4:
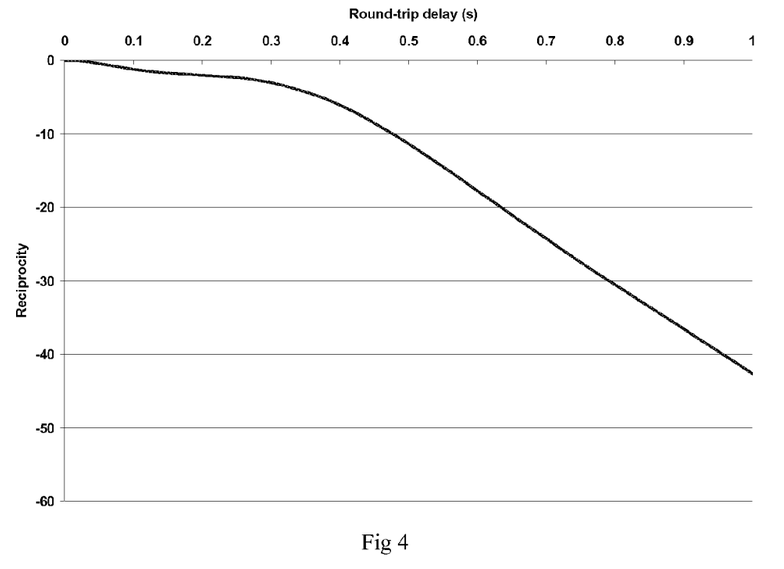
Figure 5:
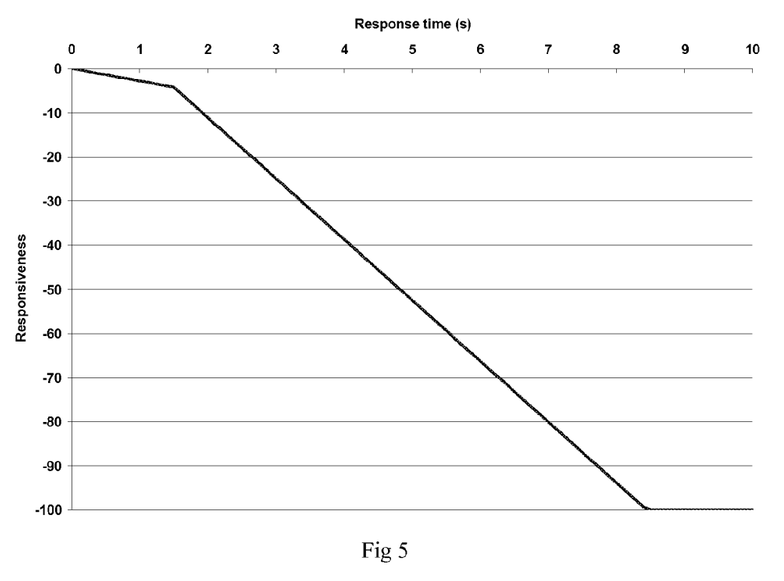
Figure 6:
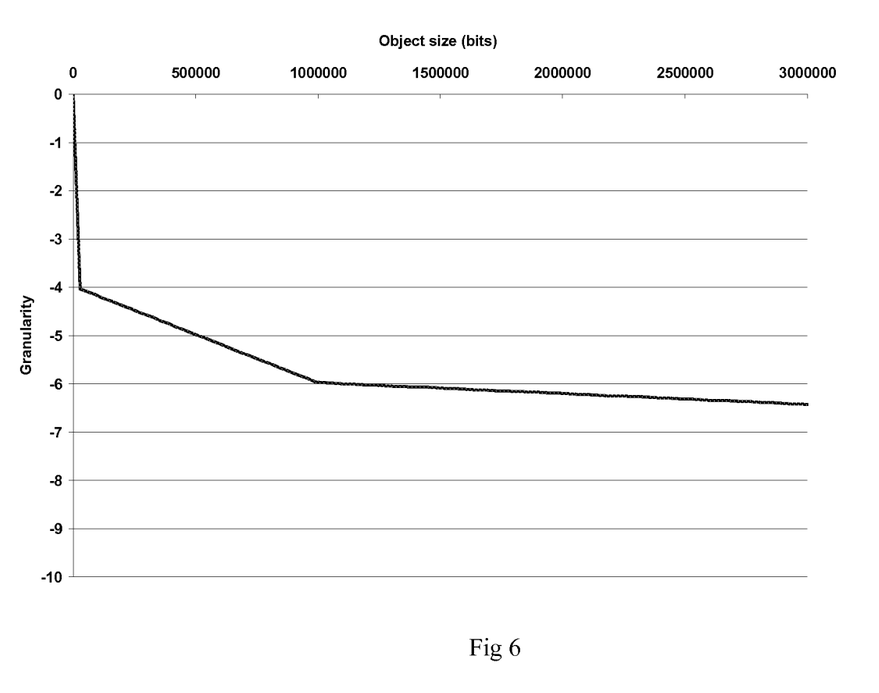

FIGS. 2 to 6 illustrate graphically the forms of transformations, that can be used to transform the indicator metrics goodput (in bits/sec), loss (expressed as loss ratio), (round trip) delay (seconds), response time (seconds), and object size (bits) into corresponding derived values, for producing a performance indicator. For convenience, and in order to provide a meaningful context, the corresponding non-linear derived values are designated as celerity, contiguity, reciprocity, responsiveness, and granularity, respectively. Conceptually, these derived values are related to the following performance-related concepts Celerity: the perception of the speed with which information is delivered and rendered to the user;

Contiguity: the perception of break up (or lack thereof) in the flow of information, e.g. caused by the loss or late delivery of information;

Reciprocity: the perception of conversational interactivity that can be sustained by mutual exchange of information;

Responsiveness: the perception of the timeliness with which a software application delivers a perceptually meaningful information object (or group of objects);

Granularity: the perception of the level of detail in application objects, as measured by e.g. codec rate or content size.

These derived values have end-to-end significance from a user-centric perspective and hence would normally be derived from performance indicator metrics measured at the user's computing device. However, derived values may also be produced from measured performance indicator metrics that have local significance (and hence achieve end-to-end significance in concatenation) or can be sampled on the path of the information flow(s).

Applications may comprise multiple components of information flow between two or more network-attached devices (e.g. machines, workstations, servers) and each component of information flow may have its own measured performance indicator metrics and perception indicator components.

Figure 2:
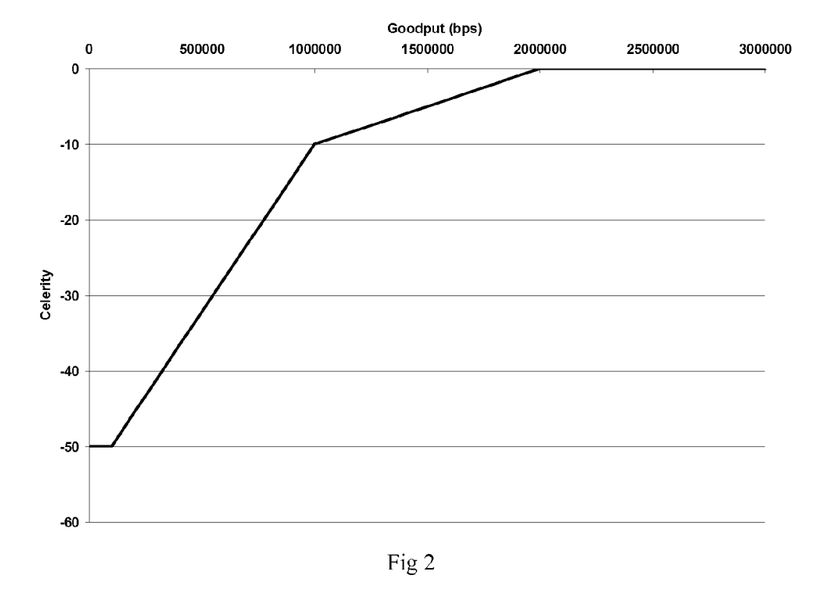
FIGS. 2 to 6 illustrate the forms of transformations, suitable for use to transform various indicator metrics into a corresponding derived value, for producing a performance indicator.

It can be seen from FIGS. 2 to 6 that each derived value is obtained by means of a non-linear transformation on the corresponding metric. In each case, the form of the graph shows a first region within which the corresponding derived value depends relatively weakly on the corresponding metric, and a second region, within which the corresponding derived value depends relatively strongly on the corresponding metric. Thus, as shown in FIG. 2, the "celerity" value obtained depends relatively weakly on the measured goodput value, for goodput values between 1,000,000 and 2,000,000 bps, but relatively strongly on goodput value for goodput values between 500,000 and 1,000,000 bps. Likewise, as shown in FIG. 3, the "contiguity" value depends relatively weakly on the measured loss ratio, for loss ratio values between 0.25 and 0.5, but relatively strongly on loss ratio for values between 0.05 and 0.15. The other three derived parameters show similar non-linear dependence on the corresponding underlying metric.

The nature of the dependence can be determined empirically, by experimentation for each metric and corresponding derived value. The transformation may then be approximated by means of a piece-wise mathematical function, having linear, or non-linear component pieces, or by a multivariate rational function. Alternatively, a simple two-dimensional lookup table may be utilised.

The derived indicator parameter may be an additive combination of two or more of the non-linear derived value components (3). Parameters (10) which can be modified by user feedback may be used to change the way in which the derived indicator parameter is calculated, in order to cause the proxy to adapt to, and predict, the user perception score with greater specificity, for example, for individual users or groups, and for individual applications or application types. The adaptation may be initiated directly by the user, or by a proxy for the user such as the corporate IT team.

The user perception score can be utilised in a variety of ways, in visualization, reporting and diagnosis (12). Two specific examples will now be explained in further detail, based on networked software applications built on TCP- and UDP-based communications respectively.

The first example is that of a web-site hosting a range of content types and object sizes and communicating via TCP with a user's web-browser. The user's perception of the web-site is a combination derived from the content structure and size, the web-server's ability to serve up the content, the ability of the network infrastructure to deliver the content to the user's web-browser, and the ability of the user's device or workstation to render the content to the user.

All five perceptual contribution types (3) are present, and make use of the following measured performance indicator metrics: goodput ($x_1$), effective loss ($x_2$), round-trip delay ($x_3$), response time ($x_4$), and object size ($x_5$).

The mathematical combinations for this example can be represented as follows:

$$\text{Celerity}(x_1) = \sum_{i=0}^{n} [[a_i \cdot (x_1 - b_i) + c_i] \cdot \Phi(x_1 - b_i)]$$

where
a=(0 4.444 $10^{-5}$ –3.444 $10^{-5}$ $-10^5$)
b=(0 100000 1000000 2000000)
c=(–50 0 0 0)
$\Phi_{(\blacksquare)}$ is the Heaviside step function $$\text{Contiguity}(x_2) = \sum_{i=0}^{n} [a_i \cdot (x_2)^i]$$

where
a=(0.4 –95 –4370 46806 –229983 665999 –1250167 1592700 –1405434 860190 –358514 97096 –15408 1087)

$$\text{Reciprocity}(x_3) = \sum_{i=0}^{n} [a_i \cdot (x_3)^i]$$

where
a=(–0.1 14.2 –1825.6 32304 –264056 1159425 –3065700 5137225 –5508120 3667760 –1382893 225760)

$$\text{Responsiveness}(x_4) = \sum_{i=0}^{n} [[a_i \cdot (x_4 - b_i) + c_i] \cdot \Phi(x_4 - b_i)]$$

where
a=(–2.8 –11 13.8)
b=(0 1.5 8.45)
c=(0 0 0)

$$\text{Granularity}(x_5) = \sum_{i=0}^{n} [[a_i \cdot (x_5 - b_i) + c_i] \cdot \Phi(x_5 - b_i)]$$

where
a:=(–4·$10^{-4}$ 3.98·$10^{-4}$ 2·$10^{-6}$)
b:=(0 10000 1000000)
c:=(0 0 0)

The indicator parameter, the user perception score (5), is given by:

UPS=100+Celerity($x_1$)+Contiguity($x_2$)+Reciprocity($x_3$)+Responsiveness($x_4$)+Granularity($x_5$)

and is hard-limited to the range 0 to 100 (i.e. if the sum is below 0 it is set to 0, and if it is above 100 it is set to 100).

The second example is of an interactive peer-to-peer application (in this particular example, a voice application, although the same method may be applied to other interactive peer-to-peer applications). This codes message flows or message signals (that may be continuous or intermittent), for example voice message flows using a codec, and places the resulting bit-stream in one or more UDP-based packet flows (at least one for each direction between the parties to the interactive application). The user's perception of the interactive application is a combination derived from the bit rate (or packet rate) achieved between the peers and the ability of the network infrastructure to deliver a packet flow at that rate with minimal loss and jitter, and with sufficiently low round-trip delay to support conversational interaction.

Four out of five perceptual contribution types are present (i.e. with non-negligible numerator coefficients), and make use of the following measured performance indicator metrics: throughput ($x_1$), effective loss ($x_2$), round-trip delay ($x_3$), and object size ($x_5$, the number of bits produced per second by the application for each message flow or message signal, i.e. the bit rate).

The mathematical combinations for this example can be represented as follows:

$$\text{Celerity}(x_1) = \sum_{i=0}^{n} [[a_i \cdot (x_1 - b_i) + c_i] \cdot \Phi(x_1 - b_i)]$$

where
a=(0 1.25·$10^{-3}$ –0.75·$10^{-3}$ –0.5·$10^3$)
b=(0 20000 40000 70000)
c=(–40 0 0 0)

$$\text{Contiguity}(x_2) = \sum_{i=0}^{n} [a_i \cdot (x_2)^i]$$

where
a=(0.4 –200 –19370 436740 –4517742 27542621 –108844504 291930000 –542327435 698798345 –613155445 349600093 –116794010 17350734)
where the effective loss, $x_2$, is the ratio of lost or late packets to total packets sent.

$$\text{Reciprocity}(x_3) = \sum_{i=0}^{n} [a_i \cdot (x_3)^i]$$

where
a=(–0.29 20.56 –766.75 6855.59 –29341.33 68709.83 –97409.63 87653.78 –50493.47 18068.78 –3661.87 321.4)

$$\text{Granularity}(x_5) = \sum_{i=0}^{n} [[a_i \cdot (x_5 - b_i) + c_i] \cdot \Phi(x_5 - b_i)]$$

where
a=(0 2.245 $10^{-4}$ –1.308 $10^{-4}$ –9.375 $10^{-5}$)
b=(0 15000 64000 128000)
c=(–17 0 0 0)

The indicator parameter, the user perception score, is given by:

$$\text{UPS}=100+\text{Celerity}(x_1)+\text{Contiguity}(x_2)+\text{Reciprocity}(x_3)+\text{Granularity}(x_5)$$

and is hard-limited to the range 0 to 100.

By way of specific illustration, using the example curves of FIGS. 2 to 6, an indicator parameter in accordance with the invention may be determined as follows:

Goodput (measured) is 750000 bps, hence celerity is −21.
Loss ratio experienced is 2%, hence contiguity is −3.
Round trip delay experienced is 110 ms, hence reciprocity is −1.5.
Response time is 0.67 s, hence responsiveness is −2.
Objects of 500000 bits are being downloaded, hence granularity is −5.

The calculated value for the indicator parameter is therefore:

$$100-21-3-1.5-2-5=67.5$$

Suppose now that the delay and loss increase (e.g. as a result of congestion in the network), then this has an impact on the achievable goodput (which is reduced), and thus the response time for downloading objects is increased.

The new values are:
Goodput is reduced to 325000 bps, hence celerity is −40.
Loss ratio experienced is 3%, hence contiguity is −5.
Round trip delay experienced is 220 ms, hence reciprocity is −2.
Response time is 1.5 s, hence responsiveness is −4.
Objects of 500000 bits are being downloaded, hence granularity is −5.

The overall perceptual quality is:

$$100-40-5-2-4-5=44$$

It is to be noted that a generic formulation can be expressed to cover both TCP- and UDP-based examples. Contiguity is expressed as a function of both loss and late arrivals (i.e. late as a result of jitter), but in the case of TCP, the jitter contribution is negligible; responsiveness is included in the UDP-based formulation, but its additive coefficient is negligible.

Calculated user perception scores may be plotted against time, and accumulated over appropriate timescales into histogram bins where the bin sizes correspond to qualitatively distinct levels of user perception (e.g. "bad", "poor", "fair", "good", and "excellent").

Over short timescales (of the order of minutes), visualizations enable users to provide feedback about the correspondence of the user perception score with the user's (or their proxy's) actual experience of the software application. This feedback can be employed in adjusting the coefficients of the mathematical combinations used to produce the indicator components, and hence the score. Different levels of detail can be provided to users for this feedback, depending on their level of technical understanding. One option is to provide independent scaling controls for each of the five types of indicator component. In its simplest form, this is achieved by scaling the metric axes. For example, if $s_i$ is the scaling parameter for metric $x_1$, then the user perception score for the web application is given by:

$$\text{UPS}=100+\text{Celerity}(s_1x_1)+\text{Contiguity}(s_2x_2)+\text{Reciprocity}(s_3x_3)+\text{Responsiveness}(s_4x_4)+\text{Granularity}(s_5x_5)$$

In another form, each indicator component, $y_i$, that is a function, $f_i(\ )$, of an indicator metric, $x_i$, i.e.

$$y_i=f_i(x_i)$$

may be transformed by adjusting feedback parameters, $a_i$ and $s_i$, as given by:

$$y_i=a_if_i(s_ix_i)$$

where $a_i$ is the additive coefficient for the indicator component, $y_i$, and $s_i$ is the scaling parameter for the metric $x_i$.

An alternative is to drive these scaling or feedback parameter controls in a coordinated way from a single 'interactivity' control. This latter approach enables software applications to be categorized on a spectrum from highly active (e.g. conversational, such as in voice or gaming applications) through transactional (e.g. interactive data applications that need to be sufficiently responsive) to passive (e.g. streaming, or file transfer, where the emphasis is on sufficiently high download speeds).

For example, if $a_i$ and $s_i$ are the feedback parameters for indicator component, $y_i$, and indicator metric, $x_i$, and I is the interactivity control, ranging from active (I>1) to passive (0<I<1), then the feedback parameters may be expressed as a function of the interactivity control in the following way. For contiguity, reciprocity, and responsiveness (i.e. i=2, 3, 4 respectively) these can be represented as follows:

$$a_i=1+0.4\log(I)$$

$$s_i=0.9I$$

For Celerity and Granularity (i.e. i=1, 5 respectively) the feedback controls $a_i$ and $s_i$ can be represented as follows:

$$a_i=1+0.5\log(I)$$

$s_i$=0.2 I Feedback may be obtained from users either in the field or in a laboratory environment. In the field, impairments are observed and experienced as they occur. In the lab, impairments are introduced to the system in a controlled manner to degrade the software application. The set of users feedback their individual scores as votes to indicate their perception of the performance of the software application under the impairment conditions experienced. The user-entered scores are compared with the derived indicator scores, for example by adjusting the interactivity control in a single dimension regression analysis, or by adjusting two or more feedback parameter controls in a multi-dimension regression analysis.

Also over short timescales, the current score value (or a statistical measure on the score) can be used to trigger diagnostic traces into the network and computing infrastructure. One way to implement this is to have a threshold value for the score, below which diagnostic tracing is switched on and above which it is switched off. An alternative method, that reflects the indicator parameter as a proxy for the mean score from a population of users, is to trigger the diagnostic tracing in a probabilistic manner. For example, the score is used as the parameter of a distribution, and the probability of being below a threshold value can be calculated. This probability increases as the score value decreases, and hence triggers diagnostic tracing more often.

Over longer timescales (of the order of hours or days), the user perception scores, their perceptual components, the underlying performance indicator metrics, and the results of the diagnostic traces can be accumulated, collated and correlated. These have many possible uses as information for the planning process. For example, it is possible to accumulate histogram summaries over network and computing infrastructure elements (as identified by the diagnostic trace results) and use trending techniques to predict which infrastructure elements are most likely to cause perception problems, and hence require capacity upgrade.

Many variations are possible, as well as those specifically described above, within the scope of the appended claims.

The invention claimed is:

1. A method of monitoring the level of performance of a software application running on a computing device attached to a computer network and communicating with one or more network-attached devices, which method comprises:
    monitoring information exchange at least one station on the network;
    measuring at least two performance indicator metrics associated with the information exchange;
    deriving an indicator parameter from a non-linear additive combination of the indicator metrics; and
    triggering a diagnostic trace into the network, for stimulating a response from the network or the computing infrastructure, in dependence upon the value of the said indicator parameter.

2. A method according to claim 1, wherein the at least two performance indicator metrics include at least two of delay, jitter, loss, response time, throughput, goodput, and object size.

3. A method according to claim 1, wherein the information exchange is an exchange of information packets.

4. A method according to claim 1, wherein the software application is a web application, a collaboration application, a gaming application, a voice application, a video application, or a machine-to-machine application.

5. A method according to claim 1, further comprising:
    applying a transformation to each said indicator metric to obtain a corresponding derived value, wherein the transformation is such as to generate a first region within which the derived value depends on the corresponding metric, and a second region, within which the derived value depends more strongly on the corresponding metric than within the first region, and additively combining at least two said derived values, to obtain the indicator parameter.

6. A method as claimed in claim 5, wherein a first said metric relates to information exchange between the computing device and a network-attached device, and the second said metric relates to information exchange between the computing device and a second network-attached device, wherein both said metrics relate to the same software application.

7. A method as claimed in claim 5, wherein a first said derived value is indicative of static web content and a second said derived value is indicative of dynamic web content, wherein the static and dynamic web content are delivered from separate network caches or web servers.

8. A method according to claim 1, the method further compromising receiving as feedback a user-entered score value, wherein the user-entered score value is indicative of the user's perception of the performance of the software application, and comparing the user-entered score with the derived indicator parameter, and optionally modifying the calculation used to derive the derived indicator parameter in dependence upon the user-entered score.

9. A method according to claim 1, including the step of generating a graphic visualisation of the calculated indicator parameter.

10. A method as claimed in claim 1 wherein the response from the network or the computing infrastructure stimulated by the diagnostic trace is route data, route performance data, system performance data, CPU data, or other management data or performance data relating to the computer network nodes or network-attached devices.

11. A method according to claim 1, wherein a separate said indicator parameter is derived for each of a plurality of software applications running on the computing device.

12. A method according to claim 1, wherein the monitoring is carried out passively, by obtaining metrics of application-generated information exchanges, or wherein the monitoring is carried out actively, by creating an information exchange adapted specifically for testing the response of the computing infrastructure or the network infrastructure to a specific stimulus.

13. A method of diagnosing and/or predicting problems in a computer system including a computer network, comprising monitoring information exchange at each of a plurality of computing devices connected to the computer network;
    measuring for each said computing device at least two performance indicator metrics associated with the information exchange;
    deriving an indicator parameter for each said computing device, from a non-linear additive combination of the indicator metrics measured for the respective said device;
    triggering a diagnostic trace into the network, for stimulating a response from the network or the computing infrastructure, in dependence upon the value of the said indicator parameter;
    collecting said indicator parameters in a database;
    collecting data resulting from said diagnostic traces triggered in dependence of the value of the said indicator parameter; and
    collating data from the collected parameters in order to diagnose and/or predict problems in the computer system.

14. A method of monitoring the level of performance of a software application running on a computing device attached to a computer network and communicating with one or more network-attached devices, which method comprises:
    monitoring information exchange at least one station on the network;
    measuring at least two performance indicator metrics associated with the information exchange;
    deriving an indicator parameter, by applying a transformation to each said indicator metric to obtain a corresponding derived value, wherein the transformation is such as to generate a first region within which the derived value depends relatively weakly on the corresponding metric, and a second region, within which the derived value depends more strongly on the corresponding metric than within the first region;
    additively combining at least two said derived values to obtain the indicator parameter; and
    triggering a diagnostic trace into the network, for stimulating a response from the network or the computing infrastructure, in dependence upon the value of the said indicator parameter.

15. A method of diagnosing and/or predicting problems in a computer system including a computer network, comprising:
    monitoring information exchange at each of a plurality of computing devices connected to the computer network;
    measuring for each said computing device at least two performance indicator metrics associated with the information exchange;
    deriving an indicator parameter for each said computing device by applying a transformation to each said indicator metric to obtain a corresponding derived value, wherein the transformation is such as to generate a first region within which the derived value depends on the corresponding metric, and a second region, within which the derived value depends more strongly on the corresponding metric than within the first region, and additively combining at least two said derived values, to obtain the indicator parameter;

collecting said indicator parameters in a database;

collecting data resulting from diagnostic traces triggered in dependence of the value of the said indicator parameter; and collating data from the collected parameters in order to diagnose and/or predict problems in the computer system.

\* \* \* \* \*